Aug. 23, 1960   G. E. MARTELL   2,949,997
FEEDING APPARATUS FOR A CONVEYOR
Filed Jan. 21, 1958   2 Sheets-Sheet 1
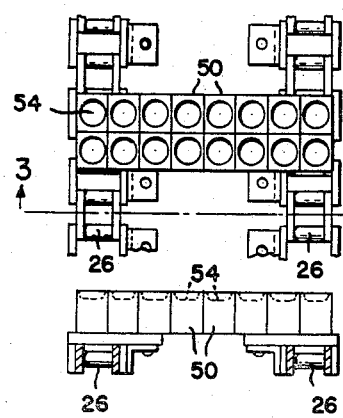
FIG. 2.
FIG. 3.
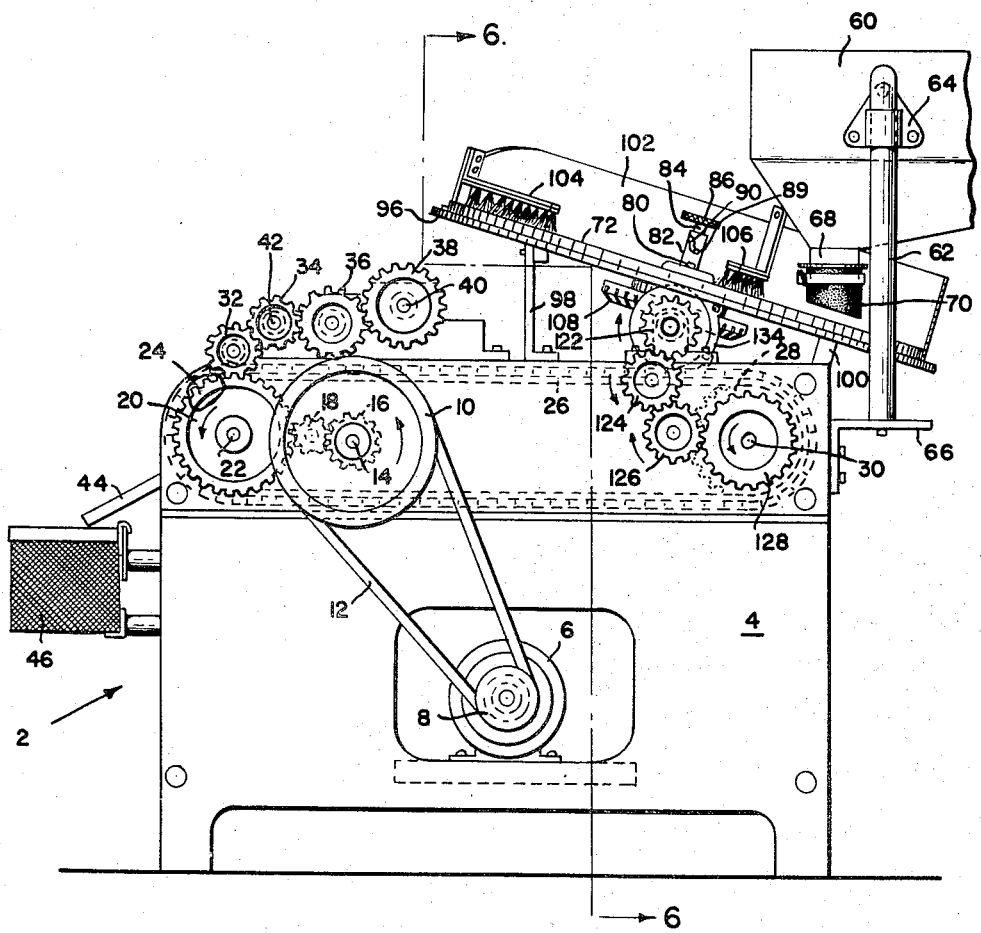
FIG. 1.
INVENTOR.
GEORGE E. MARTELL
BY
ATTORNEYS Aug. 23, 1960  G. E. MARTELL  2,949,997
FEEDING APPARATUS FOR A CONVEYOR
Filed Jan. 21, 1958  2 Sheets-Sheet 2

INVENTOR.
GEORGE E. MARTELL
BY
ATTORNEYS

United States Patent Office 2,949,997
Patented Aug. 23, 1960

2,949,997

FEEDING APPARATUS FOR A CONVEYOR

George E. Martell, Runnemede, N.J., assignor to Smith Kline & French Laboratories, Philadelphia, Pa., a corporation of Pennsylvania Filed Jan. 21, 1958, Ser. No. 710,225

5 Claims. (Cl. 198—25)

This invention relates to feeding apparatus for a conveyor. More particularly, this invention relates to feeding apparatus which is adapted to supply a conveyor with small articles, for example, pharmaceutical forms such as capsules, tablets, pellets or troches. It will be apparent that the apparatus of this invention is useful where small articles of any nature must be accurately positioned on a conveyor.

The feeding apparatus of this invention is particularly advantageous in that it provides for both the rapid and accurate feeding of articles to predetermined positions on a conveyor.

Other advantages and objects of this invention will become apparent on reading the following description in conjunction with the drawings in which:

Figure 1 is a side elevation of the feeding apparatus in accordance with this invention showing it employed in conjunction with conveying apparatus;

Figure 2 is a plan view of a portion of the conveyor;

Figure 3 is a section taken on the plane indicated by the line 3—3 in Figure 2;

Figure 5:
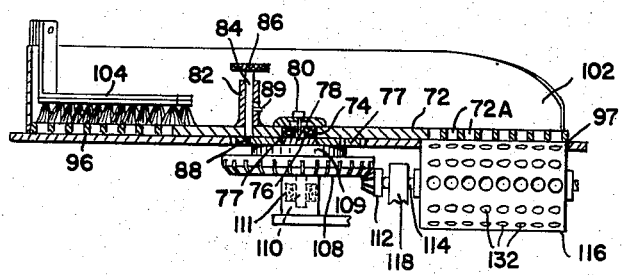
Figure 5 is a section taken on the plane indicated by the line 5—5 in Figure 4.
Figure 6:
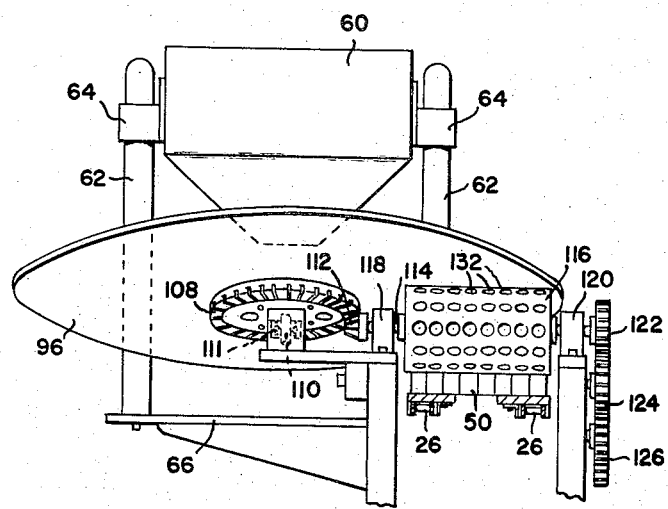
Figure 6 is a bottom perspective view of the feeding apparatus of Figure 1.
Figure 4:
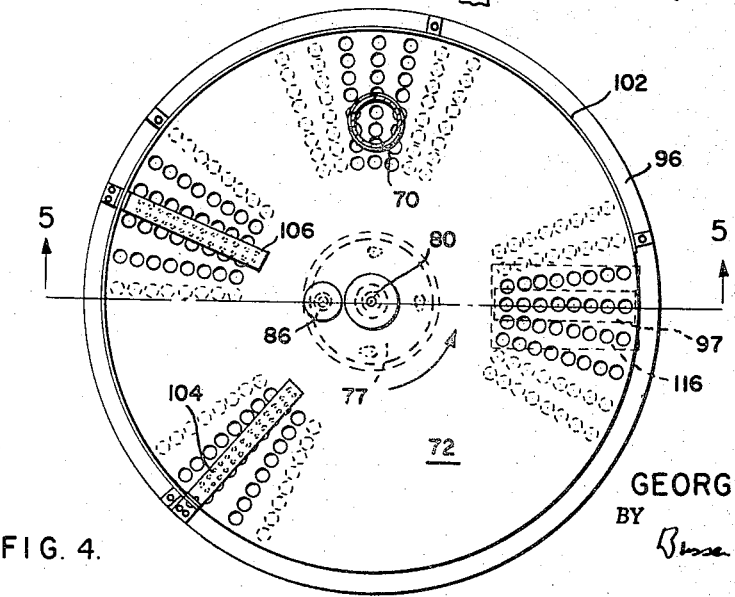
Figure 4 is a plan view of the feeding disc of Figure 1.

For purposes of illustration the feeding apparatus in accordance with this invention will be described in combination with a tablet conveyor associated with tablet printing apparatus. As shown in Figure 1, conveying and printing apparatus 2 has a supporting frame 4 on which is mounted an electric motor 6 which drives a pulley 8. Pulley 8 is connected by means of a belt 12 to pulley 10 which is secured to a shaft 14. A gear 16 secured to shaft 14 drives gear 18 which in turn drives gear 20 on shaft 22. Shaft 22 carries sprockets 24, 24 which drive conveyor chains 26, 26 which in turn drive sprockets 28, 28 secured to shaft 30.

Gear 20 drives a train of gears 32, 34, 36 and 38. Gear 38 is secured to a shaft 40 which in turn is secured to an inking drum (not shown) which is adapted to wipe ink on a printing drum (not shown) driven by shaft 42 which is secured to gear 34. A chute 44 is provided for the guidance of the discharged articles from the conveyor to a container 46.

The conveyor is provided with a series of bars 50 secured to chains 26, 26 having article carrying pockets 54.

The structure as thus far described is well known to the art and is fully disclosed in detail in United States Patent No. 2,785,786 and hence need not be described in further detail herein.

The novel aspects of this invention deal with means for feeding articles to conveyor apparatus such as described above. As shown in Figure 1, a hopper 60 adapted to contain, for example, pharmaceutical tablets, is secured to standards 62 by brackets 64, standards 62 in turn being secured to frame 4 by a bracket 66. Hopper 60 has a discharge spout 68 which has secured on its terminal end a rubber discharge tube 70. Below tube 70 there is a tilted disc 72 which is mounted so that it can freely rotate about a bearing 74 secured to a boss 76 on disc 77, bearing 74 being retained by a cap 78 to boss 76 by a bolt 80. Disc 72 is provided with a series of openings 72A which extend outwardly on radial lines.

A hollow boss 82 is secured to disc 72 and contains a plunger 84 having an operating handle 86. Plunger 84 is adapted to pass downwardly to permit its reduced end to engage an opening 88 in disc 77. The position of plunger 84 is controlled by a pin 89 secured to plunger 84 and engaging a cam track 90 in boss 82 so that when handle 86 is rotated clockwise as seen in Figure 1, plunger 84 will be raised clear of disc 77. In the event of a jam, the reduced end portion will shear off. A stationary ring 96, which has a discharge opening 97, is secured immediately below plate 72 by means of brackets 98 and 100 which are in turn secured to frame 4. A barrier 102 is secured to stationary ring 96 in order to prevent the spillage of articles which are supplied to disc 72. Brushes 104 and 106, which are secured to barrier 102, are provided to assist in the distribution of the articles which are fed to disc 72 from hopper 60 and to prevent articles outside of openings 72A from being carried around the disc to the discharge area.

Gear 108 having a hub 109 fixedly secured to disc 77 is mounted for rotation with shaft 110 which is mounted for rotation in bearing block 111. Shaft 110 is driven by pinion gear 112 secured to shaft 114 which in turn is fixedly secured to drum 116 which lies below disc 72 projecting into opening 97. Shaft 114 is mounted in bearing blocks 118 and 120 and is driven by a gear 122. Gear 122 is driven by means of gears 124 and 126 which in turn are driven by gear 128 (Figure 1).

The axes of disc 72 and drum 116 are coplanar and perpendicular to each other. Drum 116 is provided with rows of pockets 132 which are equal in number and spaced apart the same distance as the openings in each radial line on disc 72. Drum 116 moves at a constant rate with respect to the conveyor and disc 72 so that as each row of openings 132 reaches the plane of the axes of disc 72 and drum 116, a radial line of openings 72A will be in register with them.

An arcuate retaining plate 134 keeps the articles being conveyed from dropping out of openings 132 in drum 116 until the drum has turned into position to drop the articles into the pockets 54 of the conveyor.

Operation

Assuming that the articles to be conveyed are tablets, hopper 60 will contain a supply of tablets and through spout 68 and tube 70 supply tablets to disc 72. The disc 72 being tilted, the tablets will mass at the righthand side as viewed in Figure 1 and be retained by barrier 102. Disc 72 is rotated counterclockwise as viewed in Figure 1 and as it rotates below the supplied tablets, openings 72A are filled with tablets. Brushes 104 and 106 prevent tablets from being carried around to the discharge position as disc 72 rotates. Tablets are retained in openings 72A by stationary disc 96 until just before a radial line of openings 72A come into registry with openings 132 in drum 116. Here the tablets reach opening 97 in stationary disc 96 and are hence released for dropping into openings 132 in drum 116. The tablets are carried by drum 116 clockwise as viewed in Figure 1 being retained in openings 132 by retaining plate 134. When the openings 132 reach the vertical plane passing through the center of drum 116, they are in registry with pockets 54 in the conveyor and being clear of retaining plate 134, the tablets drop into pockets 54. The tablets are now carried by the conveyor through to the point where they are discharged into chute 44 and recovered in container 46, the tablets being, if desired, subjected to an operation such as printing while being conveyed.

It is not desired to be limited except as set forth in the following claims.

What is claimed is:

1. In combination with a conveyor, a rotatable disc having radial openings for the reception of small articles, a ring below said rotatable disc to support the articles in said openings, said ring having a discharge opening, a rotatable drum overlying the conveyor and positioned below the rotatable disc to project within the discharge opening in the ring, said drum having pockets for the reception of said articles delivered thereto directly from said radial openings, the axes of said disc and said drum being perpendicular to each other, means to drive the drum and the disc at a constant rate with respect to the conveyor to register said radial openings and said pockets at the plane containing said axes, and a guard adjacent said drum to retain articles in the pockets of the drum until positioned to discharge the articles to the conveyor.

2. In combination with a conveyor, a rotatable disc having radial openings for the reception of small articles, means to feed small articles to said disc, a ring below said rotatable disc to support the articles in said openings, said ring having a discharge opening, a rotatable drum overlying the conveyor and positioned immediately below the ring to project within the discharge opening therein, said drum having pockets for the reception of said articles delivered thereto directly from said radial openings, the axes of said disc and said drum being perpendicular to each other, means to drive the drum and the disc at a constant rate with respect to the conveyor to register said radial openings and said pockets at the plane containing said axes, and a guard adjacent said drum to retain articles in the pockets of the drum until positioned to discharge the articles to the conveyor.

3. In combination with a conveyor, a rotatable disc having radial openings for the reception of small articles, said disc being tilted at an angle to the horizontal, a ring below said rotatable disc to support the articles in said openings, said ring having a discharge opening, a rotatable drum overlying the conveyor and positioned immediately below the ring to project within the discharge opening therein, said drum having pockets for the reception of said articles delivered thereto directly from said radial openings, the axes of said disc and said drum being perpendicular to each other, means to drive the drum and the disc at a constant rate with respect to the conveyor to register said radial openings and said pockets at the plane containing said axes, and a guard adjacent said drum to retain articles in the pockets of the drum until positioned to discharge the articles to the conveyor.

4. In combination with a conveyor, a rotatable disc having radial openings for the reception of small articles, said disc being tilted at an angle to the horizontal, means to feed small articles to the lower end of said disc, a ring below said rotatable disc to support the articles in said openings, said ring having a discharge opening, a rotatable drum overlying the conveyor and positioned immediately below the ring to project within the discharge opening therein, said drum having pockets for the reception of said articles delivered thereto directly from said radial openings, the axes of said disc and said drum being perpendicular to each other, means to drive the drum and the disc at a constant rate with respect to the conveyor to register said radial openings and said pockets at the plane containing said axes, and a guard adjacent said drum to retain articles in the pockets of the drum until positioned to discharge the articles to the conveyor.

5. In combination with a conveyor, a rotatable disc having radial openings for the reception of small articles, a ring below said rotatable disc to support the articles in said openings, said ring having a discharge opening, a rotatable drum overlying the conveyor and positioned immediately below the ring to project within the discharge opening therein, said drum having pockets for the reception of said articles delivered thereto directly from said radial openings, the axes of said disc and said drum being perpendicular to each other, means to drive the drum and the disc at a constant rate with respect to the conveyor to register said radial openings and said pockets at the plane containing said axes and including releasable means connecting the disc to the driving means and a guard adjacent said drum to retain articles in the pockets of the drum until positioned to discharge the articles to the conveyor.

References Cited in the file of this patent

UNITED STATES PATENTS

| | | |
|---|---|---|
| 964,782 | Hull | July 19, 1910 |
| 2,208,474 | Carroll | July 16, 1940 |
| 2,742,184 | Yerkes et al. | Apr. 17, 1956 |